(12) United States Patent
Schomacker

(10) Patent No.: US 9,887,586 B2
(45) Date of Patent: Feb. 6, 2018

(54) FLOOR SYSTEM FOR A VEHICLE AND A VEHICLE HAVING A CABIN AND A FLOOR MADE BY SUCH A FLOOR SYSTEM

(71) Applicant: Airbus Operations GmbH, Hamburg (DE)

(72) Inventor: Lars Schomacker, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 767 days.

(21) Appl. No.: 14/472,557

(22) Filed: Aug. 29, 2014

(65) Prior Publication Data
US 2015/0061380 A1 Mar. 5, 2015

(30) Foreign Application Priority Data
Aug. 30, 2013 (EP) .................................. 13182413

(51) Int. Cl.
| | | |
|---|---|---|
| B61D 17/00 | (2006.01) | |
| H02J 50/10 | (2016.01) | |
| B64C 1/18 | (2006.01) | |
| B63B 17/00 | (2006.01) | |
| B64G 1/42 | (2006.01) | |
| H02J 5/00 | (2016.01) | |
| H04B 5/00 | (2006.01) | |

(Continued)

(52) U.S. Cl.
CPC .............. *H02J 50/10* (2016.02); *B61D 17/00* (2013.01); *B63B 17/00* (2013.01); *B64C 1/18* (2013.01); *B64G 1/42* (2013.01); *H02J 5/005* (2013.01); *H04B 5/0037* (2013.01); *B64C 2001/0072* (2013.01); *B64D 2221/00* (2013.01); *H02G 3/383* (2013.01); *Y02T 50/433* (2013.01)

(58) Field of Classification Search
CPC ........... B61D 17/00; B63B 17/00; B64C 1/18; B64C 2001/0072; B64G 1/42; H02J 5/005; H04B 5/0037; B64D 2221/00; H02G 3/383; Y02T 50/433
USPC ........................................................... 307/91
See application file for complete search history.

(56) References Cited

U.S. PATENT DOCUMENTS

| | | | |
|---|---|---|---|
| 6,184,651 B1 * | 2/2001 | Fernandez | H02J 7/025 320/108 |
| 6,585,189 B1 | 7/2003 | Smallhorn | |

(Continued)

OTHER PUBLICATIONS

European Patent Office, Extended European Search Report for European Patent Application No. 13182413.8, dated Jan. 23, 2014.

*Primary Examiner* — Thienvu Tran
*Assistant Examiner* — Brian K Baxter
(74) *Attorney, Agent, or Firm* — Lorenz & Kopf, LLP

(57) ABSTRACT

A floor system for a vehicle is provided. The floor system includes at least one floor panel having a top surface, a bottom surface and a first recess extending through the top surface, at least one primary coil device having at least one primary coil and a connection line, and at least one cover plate. The at least one primary coil device is positioned inside the first recess and the at least one cover plate is located in the recess above the at least one primary coil device so as to close the first recess flush with the top surface. It is possible to provide the at least one floor panel made from a carbon fiber reinforced material as it cannot electrically shield the at least one primary coil to a space above the top surface, when the at least one cover plate is made from a non-conductive material.

16 Claims, 5 Drawing Sheets

(51) Int. Cl.
*H02G 3/38* (2006.01)
*B64C 1/00* (2006.01)

(56) References Cited

U.S. PATENT DOCUMENTS

| | | | |
|---|---|---|---|
| 8,164,215 B2 | 4/2012 | Bauer et al. | |
| 8,366,042 B2 | 2/2013 | Haselmeier et al. | |
| 2008/0100980 A1* | 5/2008 | Jacas-Miret | B60N 2/002 361/113 |
| 2009/0184199 A1* | 7/2009 | Leisten | B64C 1/18 244/1 A |
| 2009/0295223 A1* | 12/2009 | Bauer | B60R 16/027 307/9.1 |
| 2010/0285747 A1* | 11/2010 | Bauer | H01F 38/14 455/41.1 |
| 2012/0025605 A1* | 2/2012 | Schneider | B60L 5/005 307/9.1 |
| 2012/0210372 A1 | 8/2012 | Kaufmann et al. | |
| 2012/0261981 A1* | 10/2012 | Paul | B64D 9/00 307/9.1 |
| 2013/0285442 A1* | 10/2013 | Bauer | H02J 5/005 307/9.1 |
| 2013/0340364 A1* | 12/2013 | Haselmeier | E04C 2/52 52/220.2 |

* cited by examiner

FLOOR SYSTEM FOR A VEHICLE AND A VEHICLE HAVING A CABIN AND A FLOOR MADE BY SUCH A FLOOR SYSTEM

CROSS-REFERENCE TO RELATED APPLICATION

This application claims priority to European Patent Application No. 13 182 413.8, filed Aug. 30, 2013, which is incorporated herein by reference in its entirety.

TECHNICAL FIELD

This application pertains to a floor system for a vehicle with at least one floor panel and at least one primary coil device for a contactless power and data transfer system. Further, the application relates to the use of a conduit raceway in a floor of a cabin of a vehicle for holding primary coil devices. The application still further relates to a vehicle having a cabin with a floor made by such a floor system and at least one contactless power and data transfer system.

BACKGROUND

In commercial vehicles, especially in aircraft, passenger cabins are increasingly equipped with electrical and electronic devices for the purpose of increasing the comfort for passengers to make travelling more pleasant and relaxing. In particular, modern aircraft for long-haul operations are often equipped with in-flight entertainment systems (IFE), in seat power supply systems or electrical adjustment and massage systems. This requires the transfer of power and data from at least one central system in the aircraft to passenger seats or other installed equipment. It is known to transfer power and data between a first vehicle part, e.g. a floor, and a second vehicle part, e.g. a passenger seat, by means of transducers formed by primary magnetic elements and secondary magnetic elements.

For example, such a system is disclosed in DE 10 2008 024 217 A1. Here, alternating voltage is transferred from a primary coil to a secondary coil, wherein data may be modulated with a high frequency onto the alternating voltage to be transferred. Especially the floor inside the cabin of the aircraft needs to be equipped with a plurality of primary magnetic elements, while the passenger seats carry the corresponding secondary magnetic elements. It is known to provide the magnetic elements underneath the floor panels or inside seat rails.

In addition, other objects, desirable features and characteristics will become apparent from the subsequent summary and detailed description, and the appended claims, taken in conjunction with the accompanying drawings and this background.

SUMMARY

Positioning primary magnetic elements underneath a floor panel in a vehicle limits the possible design options for the floor panel. If the floor panel is made from a carbon fibre reinforced plastic, it comprises a high conductivity. However, the conductivity leads to a shielding function for the transfer of power and data wirelessly. It may therefore be desirable to introduce primary magnetic elements into the cabin without the requirement to manufacture the floor panels with a non-conductive material, but at the same time not hinder any other systems or the floor space directly underneath the passenger seats.

A floor system for a vehicle is proposed, the floor system comprising at least one floor panel having a top surface, a bottom surface and a first recess extending at least through the top surface, at least one primary coil device having a primary coil and a connection line, the at least one primary coil device being positioned inside the first recess and at least one cover plate located in the first recess above the at least one primary coil device so as to close the first recess flush with the top surface. The at least one floor panel is made from a carbon fibre reinforced material and the at least one cover plate is made from a non-conductive material.

A floor panel is a component having a plate shape and generally dimensions that allow to easily carry the floor panel into a cabin of the vehicle for producing a floor by fixing an array of a plurality of floor panels on floor beams. The floor panels may be arranged edge-to-edge or may comprise a slight distance to each other, which may be filled with a sealing element or sealing material. For the purpose of providing an excellent structural stability and a least possible weight at the same time the at least one floor panel is made from a carbon fiber reinforced plastic material. This is typically realised by a core structure having a hollow structure, e.g. a honeycomb structure, and covering layers that provide the top surface and the bottom surface, respectively.

In the context of the present disclosure, a primary coil device is to be understood as a device that comprises a primary coil or a primary magnetic element that may transfer electric power and/or data to secondary coil devices or secondary magnetic elements. The primary coil device is designated to be fixed to a floor and secondary coil devices are designated to be connected to various installed components, such as passenger seats. The secondary coil devices are to be brought into an adjacent position to a primary coil device so as to form a transformer/transducer with the respective primary coil device and for supporting the induction from the primary coil device to the secondary coil device. As stated further above, this is a core part of a system for a contactless transfer or power and/or data, as exemplarily disclosed in DE 10 2008 024 217 A1. Here, alternating voltage is transferred from a primary coil in a primary coil device to a secondary coil, wherein data to be transferred may be modulated by superposing a high frequency oscillation onto the alternating voltage transferred from the primary coil to the secondary coil. The floor made by the above mentioned floor panels inside the cabin of the aircraft may be equipped with a plurality of these primary coils, while exemplarily passenger seats carry the corresponding secondary magnetic coils.

According to the various teachings of the present disclosure, the at least one floor panel has a first recess, which extends at least through the top surface of the floor panel, which top surface is the surface facing into the cabin of the vehicle after creation of the floor. The installed components, e.g. passenger seats, partitions or other monuments, follow on from the top surface into the cabin. Hence, the at least one primary coil device positioned inside the first recess is not shielded by the floor panel and exerts an electromagnetic oscillation through the non-conductive cover plate directly into the direction to the installed components. By covering the first recess carrying the at least one primary coil device made from a non-conductive material, the ability to transfer power and/or data to the secondary coil device is not negatively influenced. The non-conductive material may comprise a plastic material without conductive reinforcement elements, wood and any other suitable material. In one example, if a plurality of floor panels positioned adjacent to each other is present, the first recess continuously extends through a plurality of floor panels along at least one straight line.

The expression "flush" regarding the cover plate on the first recess is not to be understood in a way that the precision is extremely large and the tolerance between the surface levels of the at least one floor panel and the cover plate is extremely low. Instead, this term is to be understood in a way that a conventional floor covering, e.g. a carpet, provides a rather smooth surface for the passengers, substantially without any noticeable elevations or depressions.

In one embodiment, the first recess also extends through the bottom surface. A conduit raceway is installed at the bottom surface, which means that the conduit raceway is accessible from the first recess in order to introduce or remove lines. Consequently, the conduit raceway is accessible from the top surface of the floor panel. This conduit raceway is a device for carrying various lines, especially electrical lines, in a cabin. The access for the conduit raceway may therefore advantageously be used for carrying the at least one primary coil device.

In one embodiment, the at least one primary coil device comprises a bracket, which is insertable between side faces of the first recess underneath the top surface. A bracket stands for a base component or a frame that carries one or more primary coils. The first recess extending through the top surface into the interior of the floor panel has laterally delimiting faces that depend on the contour of the first recess and the course of the width of the first recess along the way from the top surface into the direction of the bottom surface. For example, the first recess may comprise a change in its width through the floor panel from the top surface towards the bottom surface such that the primary coil device may rest on a step, a protrusion or another singularity inside the first recess. Furthermore, also the bracket may comprise a protrusion that rests in an indentation or another singularity of the first recess. Both variants may also be used in combination.

In one embodiment, the first recess has an elongate shape and is designed for carrying a plurality of primary coil devices. This allows the floor system according to the present disclosure to provide a plurality of primary coil devices along a cabin floor that are able to create transducers with at least one secondary coil device in a plurality of different positions. It goes without saying that the overall dimensions of the primary coil devices, the secondary coil devices and the distance between the primary coil devices should be adjusted to each other in order to be able to provide a power and data transfer between at least one primary coil device and each secondary coil device. Hence, a secondary coil device may have an extension that allows it to bridge the distance between contiguous primary coil devices and the extension of one primary coil device or vice-versa.

In one embodiment, the first recess has a plurality of grid means for aligning the at least one primary coil device relative to the first recess, wherein the grid means are distributed along the first recess and comprise a predetermined distance to each other. Further, the at least one primary coil device is alignable by a grid means in the first recess. This allows to reliably provide a plurality of primary coil devices in a predetermined grid along the floor and prevents misalignment of a primary coil device, wherein the predetermined distance between the grid means may be constant. For example, the grid means may comprise indentations, protrusions, slits, slots, steps, notches, grooves, pins or bore holes that may provide a positive connection with correspondingly designed protrusions, indentations, clips, tongues, pins or grooves of a primary coil device. Of course, a plurality of different grid means may be used in combination. This list of possible grid means is not exhaustive and all other means for especially providing positive connections or alignments may be useable.

In one embodiment, the side faces of the first recess at the top surface are wider than at the bottom surface. By designing the primary coil devices, e.g. the bracket if a bracket is present, to conform these side faces, the primary coil devices are guided in order to be aligned at least parallel to the top surface and along an extension direction of the first recess.

In one embodiment, the side faces of the first recess are inclined. For example, the width of the first recess continuously decreases from the top surface to the bottom surface in a substantially linear manner. By simply bevelling the outer contour of the primary coil device corresponding to the side faces of the first recess, the guiding function for the primary coil devices in the first recess can be accomplished.

In one example, the height of the primary coil device equals or falls below the thickness of the floor panel. The primary coil device may therefore not hinder the installation space in a conduit raceway installed at the underside of the respective floor panel.

According to one embodiment, a primary coil device comprises a plurality of primary coils. It is imaginable that a primary coil device comprises three or more primary coils that are arranged at a distance to each other on a bracket or on another base element, which may be insertable into the first recess. The primary coils may be connected to an individual line each or to a common electrical line. The electrical line is connectable to a control unit, which controls the operation of the primary coil devices and the primary coils connected to the control unit.

The connection line of each primary coil device may be connected to a central control unit, wherein single primary coils or groups of primary coils on one or a plurality of primary coil devices may be connected to a single control channel of the control unit each.

Alternatively, each primary coil device may comprise an individual control unit, which is connected to all primary coils present in the respective primary coil device, wherein the connection lines of a plurality of primary coil devices are connected to each other in a parallel or serial connection. This allows for a reduction in the amount of necessary electrical lines from a plurality of primary coil devices to a central control unit, as the individual control units on the primary coil device may conduct the control of operation of all connected primary coils. However, this transfers the function of controlling individual primary coils into the primary coil device, such that a data transfer to the individual control units is necessary, if a central management of the primary coil devices is required.

If a primary coil device comprises a plurality of primary coils, the primary coil device may comprise an elongate shape with an extension along a longitudinal axis parallel to the first recess, wherein the longitudinal extension clearly exceed the lateral extension of the primary coil device. It is preferable to design such a primary coil device in that it comprises a longitudinal extension that allows placement of one primary coil device after another in the first recess, wherein adjacent primary coil devices may rest edge-to-edge or with a placeholder or distance element arranged between the edges of two adjacent primary coil devices facing to each other.

Still further, the cover plate may be made from a glass fibre reinforced plastic material. Such a cover plate is non-conductive but comprises an advantageous stiffness and endurance for using in a floor of a vehicle that continuously encounters different loads induced by passengers, vehicle attendants and luggage.

Further, a vehicle is proposed, the vehicle comprising a cabin with a floor made by a floor system as explained above and at least one contactless power and data transfer system. The vehicle may be an aircraft, but the teachings of the present disclosure are not limited to this kind of vehicle, which may also be any road, water, rail or space vehicle.

Further, the use of a conduit raceway in a floor of a cabin of a vehicle is proposed, the floor having floor panels made from a carbon fiber reinforced plastic material, the conduit raceway being positioned underneath a first recess in the floor panels and closed by a cover plate made from a non-conductive material, for holding primary coil devices for a contactless power and data transfer system. The conduit raceway extends through a straight line along substantial sections of the floor.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
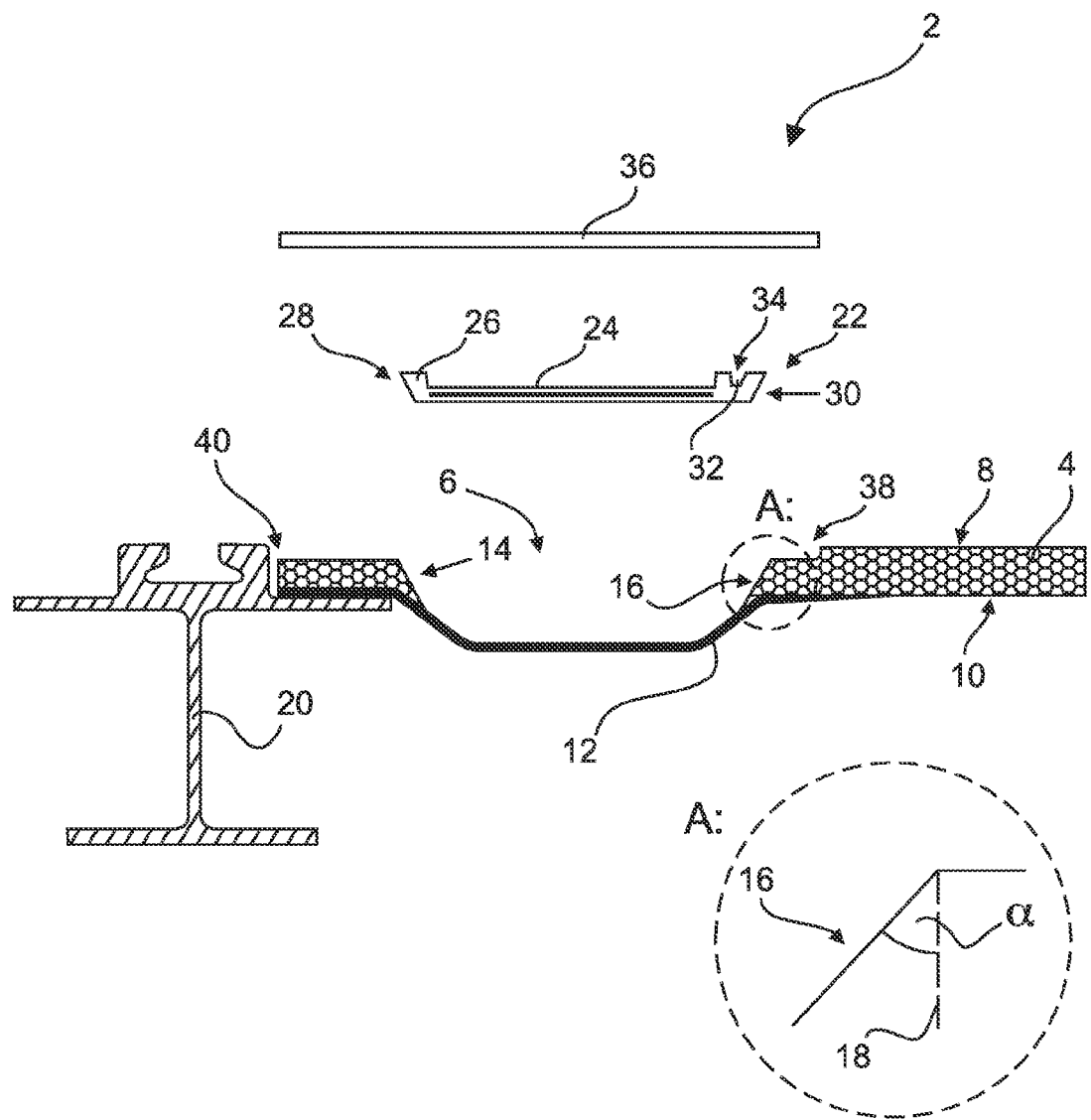
FIG. 1 shows an exploded view of a floor system.
Figure 2:
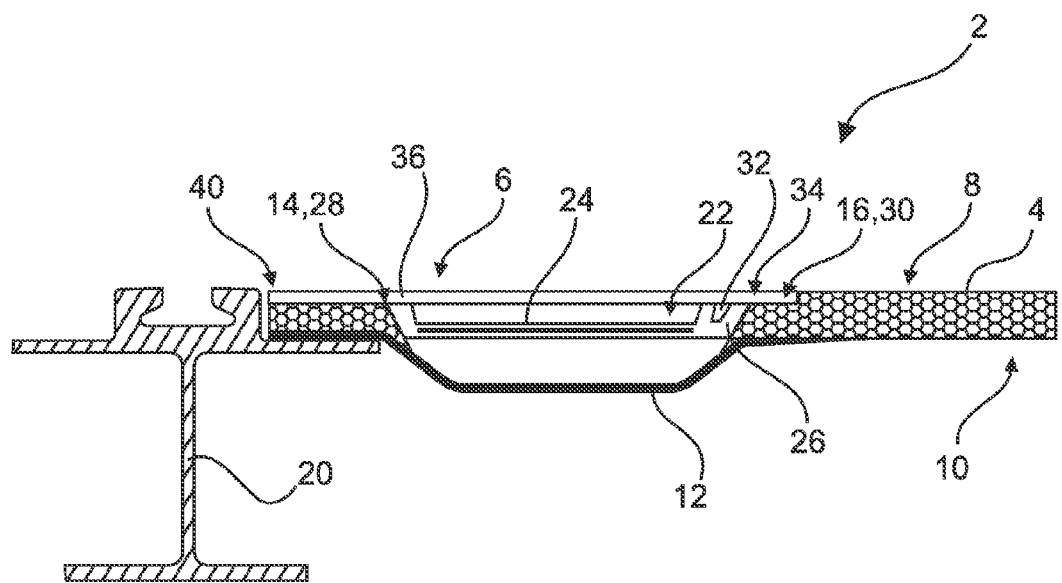
FIG. 2 shows a floor system in a sectional view.

FIG. 1 shows a sectional view of a floor system 2 according to the various teachings of the present disclosure. Here, a floor panel 4 made from a carbon fibre reinforced plastic is depicted, which comprises a first recess 6 extending through a top surface 8 and a bottom surface 10, to which a conduit raceway 12 is mounted. The recess 6 comprises side faces 14 and 16 delimiting the recess 6 in a lateral direction. Exemplarily, as shown in sectional view A, the side faces 16 and 14 are inclined so as to enclose an angle α with an axis 18 arranged perpendicular to the top surface 8 and the bottom surface 10, respectively. The recess 6 allows placement of various lines onto the conduit raceway 12 from above the floor panel 4, such as electrical lines for transferring power and/or data.

For the purpose of providing a contactless transfer of power and data to objects that are placed above the floor panel 4 and that may be attached to a seat rail 20, a primary coil device 22 is provided. The primary coil device 22 comprises at least one primary coil 24, wherein the expression "primary coil" stands for a coil or magnetic element that is connectable to a central source of power and/or data for transferring power that may be aligned above/adjacent to the primary coil 24. A system for transferring power and/or data from a primary coil to a secondary coil is e.g. described in DE 10 2008 024 217 A1 as mentioned above.

The primary coil device 22 exemplarily comprises a bracket 26, which holds the primary coil 24 in place. The bracket 26 comprises side faces 28 and 30 that are shaped corresponding to the side faces 14 and 16 of the recess 6 in the floor panel 4. Consequently, the side faces 28 and 30 have an inclined shape, which leads to a positive connection between the bracket 26 and the floor panel 4 inside the recess 6 as well as a guiding function for the primary coil device 22. Of course, further combinations of indentations, protrusions, cut-outs, grooves and other singularities are useable for providing a guiding function for the primary coil device 22.

Exemplarily, a connection line 32, which is connected to the primary coil 24, is positioned inside a second recess 34 laterally distanced from the primary coil 24, in which second recess 34 a connection to at least one primary coil 24 or to a connection line for connecting a plurality of primary coils 24 is made. The connection line 32 may also be placed in the conduit raceway 12. By means of the connection line 32, the primary coil 24 can be connected to a central source of power and/or data.

It is imaginable to provide a plurality of primary coil devices 22 in the floor panel 4 or a plurality of floor panels 4 arranged adjacent to each other for forming a closed floor, and to connect all primary coils 24 by means of the connection line 32. For this purpose, single, decentralised control units would be advantageous in order to reduce the required amount of cables from the primary coil devices to a central control unit.

Providing the primary coil device 22 in the first recess 6, which is accessible from above the top surface 8, leads to avoiding a shielding function that would be caused by the conductivity of the floor panel 4 when primary coils were arranged under the floor panel 4. For the purpose of providing a flush arrangement with a top surface 8, a cover plate 36 is provided. This cover plate 36 is generally manufactured by use of a glass fibre reinforced plastics material, but also other non-conductive materials may be feasible.

The floor panel 4 may comprise a third recess 38, which may be arranged at a distance from an outer edge 40 of the floor panel 4 and provides a support for the cover plate 36. The outer edge 40 may be positioned on a seat rail 20. Consequently, the thickness of the floor panel 4 at the outer edge 40 is reduced by the thickness of the cover plate 36.

The installation of the primary coil device 22 may be conducted from a cabin side. This means that with installed floor panels 4, primary coil devices 22 may be inserted into the first recess 6 and may afterwards be connected to a central source of power and/or data by means of the connection line 32. Maintenance may also be performed from a cabin side and may only require lifting a floor covering, e.g. a carpet, above the cover plate 36 and change or repair the respective primary coil device 22.

Figure 3A:
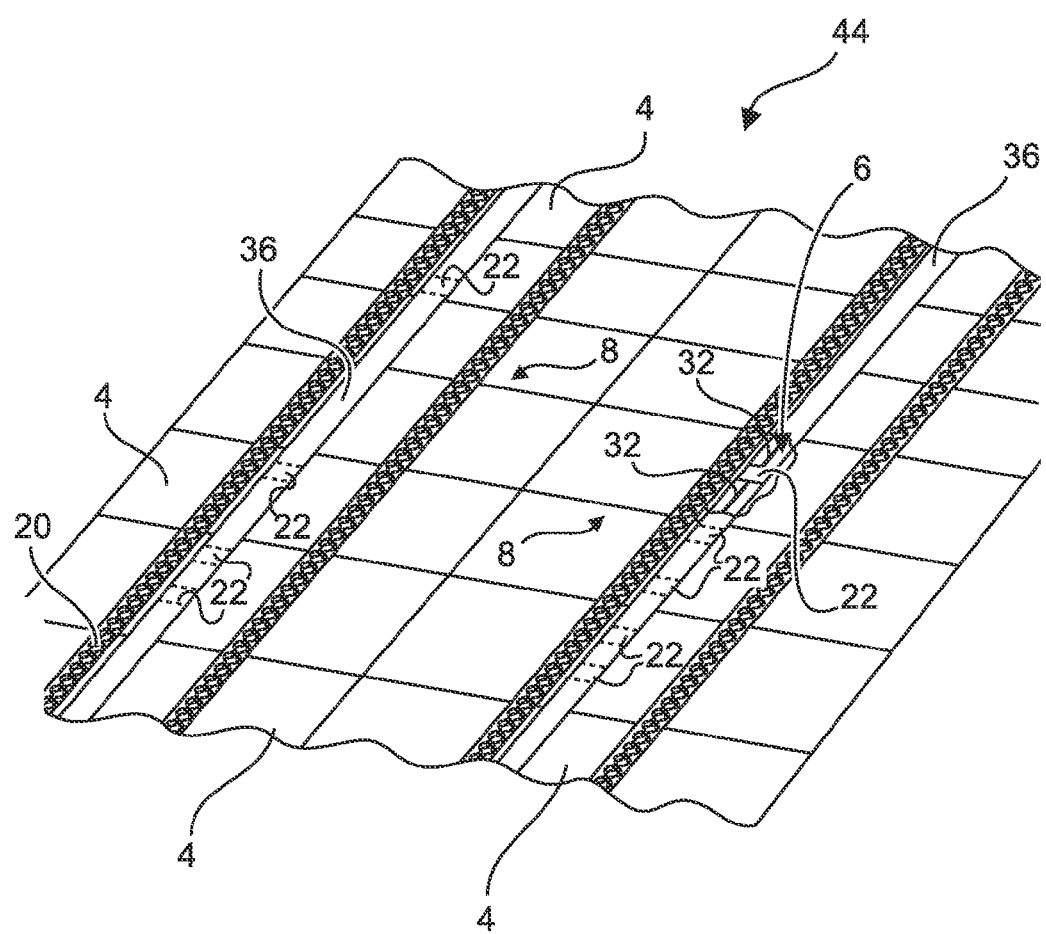
FIGS. 3A, 3B, 3C and 3D show a floor made under use of a floor system.

FIG. 3A shows a cabin floor in the cabin of a vehicle, e.g. an aircraft. Here, it is clearly visible that a plurality of floor panels 4 is arranged in an array so as to constitute the floor. The setup is merely an example and does not limit the subject-matter of the present disclosure. Here, exemplarily, two pairs of seat rails 20 are arranged on the floor such that a central aisle 44 between the two pairs of seat rails 20 is created. In each pair of seat rails 20, passenger seat groups may be installed and fixed. On both sides of the cabin floor, conduit raceways 12 are positioned underneath a recess 6, in which a plurality of primary coil devices 22 is arranged.

Through the cover plate 36, the floor has a completely even surface. The conduit raceway 12 and the cover plate 36 extends over a substantial part of the floor in the cabin, such that electrical lines may be routed from a foremost end of the cabin to a rearmost end of the cabin and vice-versa.

Figure 3B:
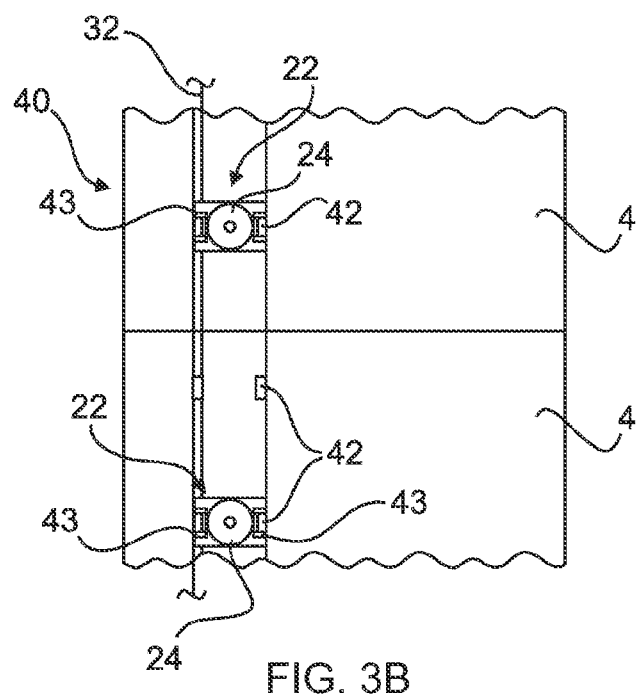

As shown in FIG. 3B, the recess 6 may comprise grid means 42 that are capable of supporting the arrangement of primary coil devices 22 with predetermined distances to each other. For this purpose, the primary coil devices 22 may comprise second grid means that correspond to the first grid means of the first recess 6. For example, the grid means 42 are protrusions and the second grid means 43 are indentations with a shape that corresponds to the shape of the protrusions. Of course, all other known grid means 42 are possible for aligning the primary coil devices 22, either with a single kind of grid means or a combination thereof, e.g. a combination of pins and boreholes in the first recess and a combination of boreholes and pins in the primary coil devices 22.

Figure 3C:
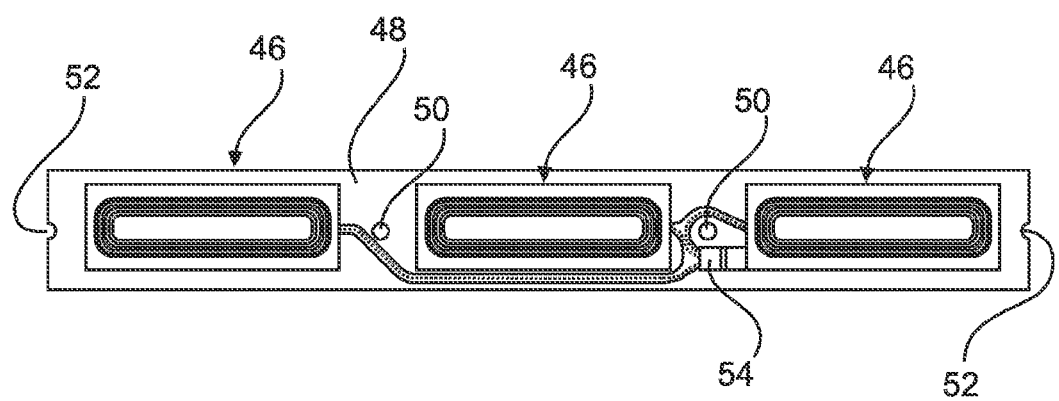
Figure 3D:
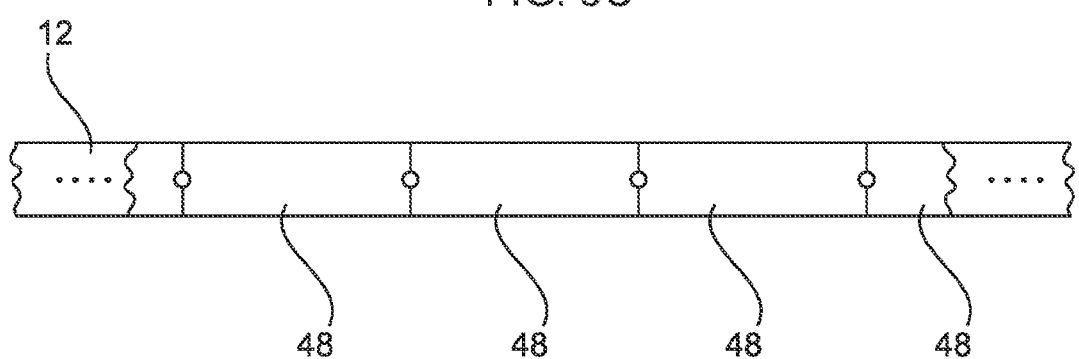

In FIG. 3C, a primary coil device 48 is depicted, which exemplarily comprises three elongated primary coils 46. These may be connected over an electrical connector 54 to a control unit, which is not shown in this drawing. The primary coil device 48 may have an extension that is in a range of a minimum seat row distance, which ensures that secondary coils may reliably be positioned above such a primary coil device 48. If necessary, place holders or distance elements may be installed between the edges of two adjacent primary coil devices 48 that face each other in order to allow for larger seat row distances. As an alternative, these primary coil devices 48 may also be arranged in an edge-to-edge relationship, as shown in FIG. 3D.

Exemplarily, the primary coil device 48 comprises a number of bore holes 50, which constitute grid means for allowing a precise aligning of the primary coil device 48 in correspondingly shaped pins located in the first recess. At outer edges in a longitudinal direction of the primary coil device 48 cut-outs 52 are provided, which may constitute an opening comparable to a bore hole 50, when the primary coil device 48 is positioned directly adjacent to a further primary coil device 48 having the same cut-outs 52, in combination.

Figure 4:
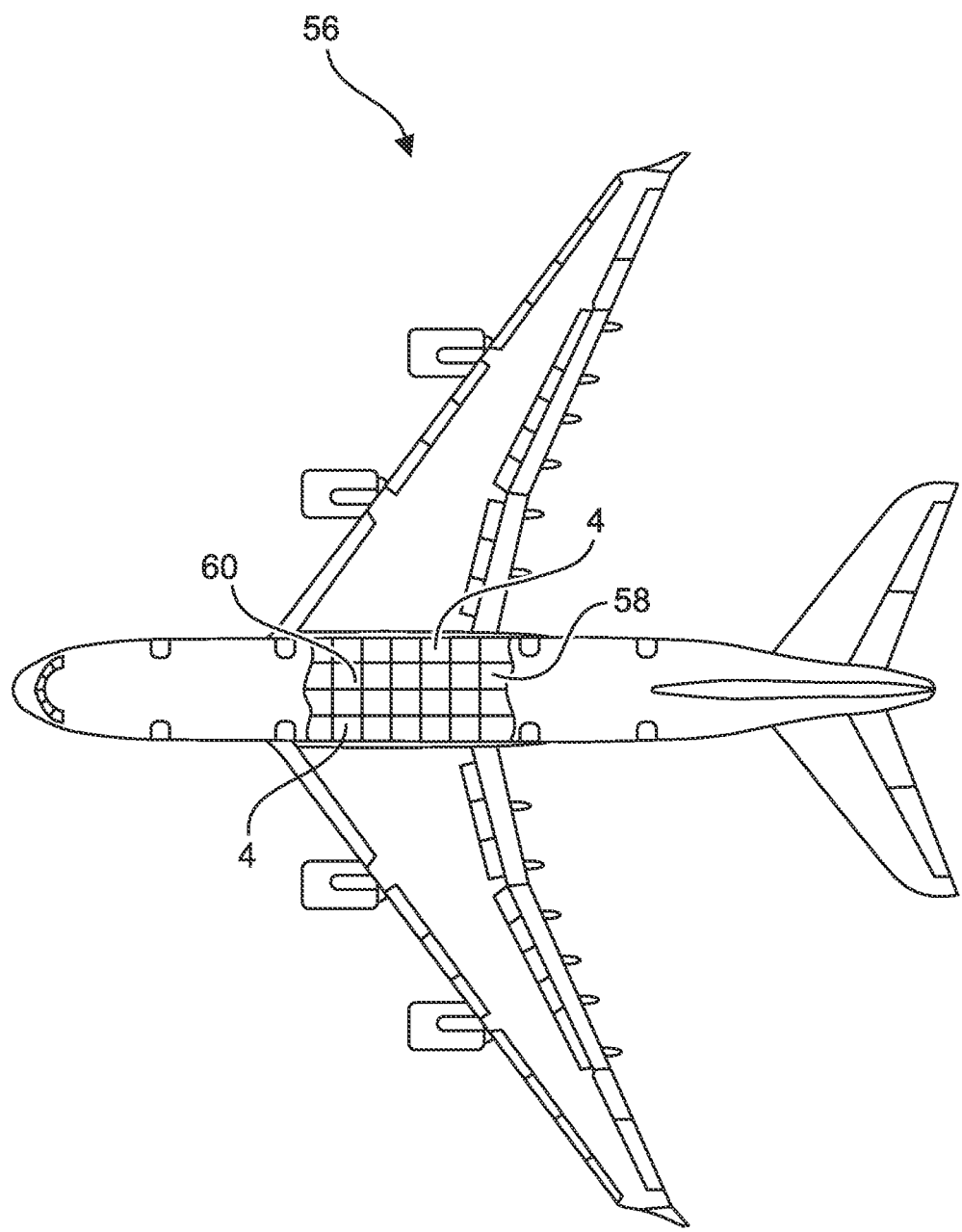
FIG. 4 shows a vehicle having a floor made under use of a floor system in a lateral view having partial sections.

Finally, FIG. 4 shows a vehicle 56 in the form of an aircraft, which vehicle 56 comprises a cabin 58 having a floor 60 made from a floor system 2. For this purpose of clarification, only the floor panels 4 are shown.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A floor system for a vehicle, comprising:
   at least one floor panel having a top surface, a bottom surface and a first recess extending through the top surface and the bottom surface,
   at least one primary coil device having at least one primary coil and a connection line,
   at least one cover plate, and
   a conduit raceway,
   wherein the conduit raceway is installed at the bottom surface extending away from the top surface,
   wherein the at least one primary coil device is positioned inside the first recess and the at least one cover plate is located in the first recess above the at least one primary coil device so as to close the first recess flush with the top surface, the at least one floor panel is made from a carbon fibre reinforced material and the at least one cover plate is made from a non-conductive material,
   wherein the first recess includes sides that are inclined, such that the width of the first recess is larger at the top surface than at the bottom surface, and
   wherein the at least one primary coil device comprises a bracket, which has inclined side faces corresponding to the side faces of the first recess, such that the bracket holds the primary coil device in place above the conduit raceway through a positive connection with the side faces of the first recess.

2. The floor system of claim 1,
   wherein the first recess has an elongate shape and is designed for carrying a plurality of primary coil devices.

3. The floor system of claim 2,
   wherein the first recess has a plurality of grid means that are distributed along the first recess at a predetermined distance to each other.

4. The floor system of claim 1, wherein the at least one primary coil device comprises a plurality of primary coils.

5. The floor system of claim 4, wherein the at least one primary coil device comprises an elongate shape with a length that equals a minimum seat row distance in a cabin of the vehicle.

6. The floor system of claim 1, wherein the connection line of the at least one primary coil device is connected to a central control unit.

7. The floor system of claim 1, wherein the at least one primary coil device includes single primary coils or groups of primary coils, and the single primary coils or groups of primary coils are connected to an individual decentralized control unit.

8. The floor system of claim 1,
   wherein the cover plate is made from a glass fibre reinforced plastic material.

9. A vehicle, comprising:
   a cabin with a floor made by a floor system, the floor system including at least one floor panel having a top surface, a bottom surface and a first recess extending at least through the top surface; and
   at least one contactless power and data transfer system including at least one primary coil device having at least one primary coil and a connection line, the at least one primary coil device positioned inside the first recess,
   wherein at least one cover plate is located in the first recess above the at least one primary coil device so as to close the first recess flush with the top surface,
   wherein the first recess includes inclined sides, such that the width of the first recess is larger at the top surface than at the bottom surface, and
   wherein the at least one primary coil device comprises a bracket, which has inclined side faces corresponding to the side faces of the first recess, such that the bracket holds the primary coil device in place above a conduit raceway through a positive connection with the side faces of the first recess.

10. The vehicle of claim 9, wherein the vehicle is an aircraft.

11. The vehicle of claim 9, further comprising a conduit raceway,
   wherein the first recess extends through the bottom surface and the conduit raceway is installed at the bottom surface.

12. The vehicle of claim 9, wherein the first recess includes sides having faces, and the at least one primary coil device comprises a bracket, which is insertable between the faces of the sides of the first recess underneath the top surface.

13. The vehicle of claim 9, wherein the first recess has an elongate shape and is designed for carrying a plurality of primary coil devices.

14. The vehicle of claim 13, wherein the first recess has a plurality of grid means that are distributed along the first recess at a predetermined distance to each other.

15. The vehicle of claim 9, wherein the first recess includes sides and the sides of the first recess are inclined.

16. The vehicle of claim 9, wherein the at least one primary coil device comprises a plurality of primary coils.

\* \* \* \* \*